United States Patent
Weber et al.

(10) Patent No.: US 7,960,477 B2
(45) Date of Patent: Jun. 14, 2011

(54) POLYAMIDES WITH ACRYLATE RUBBERS

(75) Inventors: Martin Weber, Maikammer (DE); Rajan Venkatesh, Mannheim (DE)

(73) Assignee: BASF SE, Ludwigshafen (DE)

( * ) Notice: Subject to any disclaimer, the term of this patent is extended or adjusted under 35 U.S.C. 154(b) by 7 days.

(21) Appl. No.: 12/519,030

(22) PCT Filed: Dec. 5, 2007

(86) PCT No.: PCT/EP2007/063329
§ 371 (c)(1),
(2), (4) Date: Jun. 12, 2009

(87) PCT Pub. No.: WO2008/071603
PCT Pub. Date: Jun. 19, 2008

(65) Prior Publication Data
US 2010/0048821 A1    Feb. 25, 2010

(30) Foreign Application Priority Data

Dec. 13, 2006 (EP) .................................. 06125991

(51) Int. Cl.
*C08F 8/30* (2006.01)
(52) U.S. Cl. .................... 525/183; 524/514; 525/222
(58) Field of Classification Search .................. 524/514; 525/522, 183, 222
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 2,520,959 A | 9/1950 | Powers | |
| 3,393,210 A | 7/1968 | Speck | |
| 3,397,165 A | 8/1968 | Goodman et al. | |
| 4,269,749 A | 5/1981 | Marriott et al. | |
| 4,360,617 A | 11/1982 | Muller et al. | |
| 5,589,544 A * | 12/1996 | Horrion | 525/176 |
| 5,591,798 A * | 1/1997 | Patel | 524/514 |
| 2009/0149604 A1* | 6/2009 | Abhari et al. | 525/209 |

FOREIGN PATENT DOCUMENTS

| | | |
|---|---|---|
| DE | 2702661 A1 | 8/1977 |
| DE | 4003422 A1 | 8/1991 |
| DE | 19624299 A1 | 1/1997 |
| DE | 19621027 A1 | 11/1997 |
| DE | 197 41 187 A1 | 3/1999 |
| DE | 19741184 A1 | 3/1999 |
| DE | 198 05 122 A1 | 4/1999 |
| DE | 19828183 A1 | 12/1999 |
| DE | 198 39 199 A1 | 3/2000 |
| DE | 198 40 586 A1 | 3/2000 |
| DE | 19847115 C1 | 5/2000 |
| DE | 10313681 A1 | 10/2004 |
| EP | 0038094 A2 | 10/1981 |
| EP | 0038582 A2 | 10/1981 |
| EP | 0039524 A1 | 11/1981 |
| EP | 129195 A2 | 12/1984 |
| EP | 129196 A2 | 12/1984 |
| EP | 299444 A2 | 1/1989 |
| EP | 0 771 328 A1 | 5/1997 |
| EP | 922065 A2 | 6/1999 |
| EP | 1198491 A1 | 4/2002 |

OTHER PUBLICATIONS

S.Wu, "Formation of Dispersed Phase in Incompatible Polymer Blends: Interfacial and Rheological Effects,"Polymer Engineering and Science, vol. 27, No. 5, 1987, pp. 335-343.
R.J. Gaymans, "Toughening of Semicrystalline Thermoplastics," Polymer Blends, vol. 2, 2000, pp. 177-224, Eds. D.R. Paul, C.B. Bucknall.

* cited by examiner

*Primary Examiner* — David Wu
*Assistant Examiner* — Marie Reddick
(74) *Attorney, Agent, or Firm* — Connolly Bove Lodge & Hutz LLP

(57) ABSTRACT

Thermoplastic molding compositions, comprising
A) from 10 to 95% by weight of a thermoplastic polyamide,
B) from 5 to 90% by weight of an acrylate rubber, obtainable via free-radical-initiated aqueous emulsion polymerization of ethylenically unsaturated monomers in the presence of at least one dispersing agent and of at least one free-radical initiator, where the emulsion polymerization uses
  from 1 to 50% by weight of an alkene having from 5 to 12 carbon atoms [monomer A], and
  from 50 to 99% by weight of an ester based on an $\alpha,\beta$-monoethylenically unsaturated mono- or dicarboxylic acid having from 3 to 6 carbon atoms and on an alkanol having from 1 to 12 carbon atoms [monomer B], and also, if appropriate,
  up to 10% by weight of an $\alpha,\beta$-monoethylenically unsaturated mono- or dicarboxylic acid having from 3 to 6 carbon atoms and/or its amide [monomer C], and
  up to 30% by weight of an $\alpha,\beta$-ethylenically unsaturated compound different from the monomers A to C [monomer D],
  and the monomers A to D give a total of 100% by weight,
C) from 0 to 40% by weight of a copolymer which comprises vinylaromatic monomer units,
D) from 0 to 70% by weight of further additives,
where the total of the percentages by weight of A) to D) is 100%.

17 Claims, No Drawings ately from 70 to 170 ml/g, determined in 0.5% strength by weight solution in 96% strength by weight sulfuric acid at 25° C. to ISO 307.

Semicrystalline or amorphous resins whose molecular weight (weight-average) is at least 5000 are preferred, examples being those described in the U.S. Pat. Nos. 2,071,250, 2,071,251, 2,130,523, 2,130,948, 2,241,322, 2,312,966, 2,512,606, and 3,393,210.

Examples here are polyamides which derive from lactams having from 7 to 13 ring members, for example polycaprolactam, polycaprylolactam, and polylaurolactam, and also polyamides obtained via reaction of dicarboxylic acids with diamines.

Dicarboxylic acids that can be used are alkanedicarboxylic acids having from 6 to 12, in particular from 6 to 10 carbon atoms, and aromatic dicarboxylic acids. Just a few acids that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine, di(4-aminophenyl)methane, di-(4-aminocyclohexyl)methane, 2,2-di(4-aminophenyl)propane, 2,2-di(4-aminocyclohexyl)propane, or 1,5-diamino-2-methylpentane.

Preferred polyamides are polyhexamethyleneadipamide, polyhexamethylene-sebacamide, and polycaprolactam, and also nylon-6/6,6 copolyamides, in particular having from 5 to 95% by weight content of caprolactam units.

Other suitable polyamides are obtainable from ω-aminoalkylnitriles, such as aminocapronitrile (PA 6) and adipodinitrile with hexamethylenediamine (PA 66), by what is known as direct polymerization in the presence of water, as described by way of example in DE-A 10313681, EP-A 1198491, and EP 922065.

Mention may also be made of polyamides obtainable by way of example via condensation of 1,4-diaminobutane with adipic acid at an elevated temperature (nylon-4,6). Preparation processes for polyamides of said structure are described by way of example in EP-A 38 094, EP-A 38 582, and EP-A 39 524.

Other suitable polyamides are those obtainable via copolymerization of two or more of the abovementioned monomers, or a mixture of a plurality of polyamides, in any desired mixing ratio.

Semiaromatic copolyamides, such as PA 6/6T and PA 66/6T, have moreover proven particularly advantageous, the triamine content of these being less than 0.5% by weight, preferably less than 0.3% by weight (see EP-A 299 444).

The processes described in EP-A 129 195 and 129 196 can be used to prepare the preferred semiaromatic copolyamides having low triamine content.

The following list, which is not comprehensive, comprises the polyamides A) mentioned and other polyamides A) for the purposes of the invention, and the monomers comprised:

POLYAMIDES WITH ACRYLATE RUBBERS

CROSS REFERENCE TO RELATED APPLICATIONS

This application is a National Stage of PCT/EP2007/063329, filed on Dec. 5, 2007 which claims priority to EP 06125991.7 filed Dec. 13, 2006, the entire contents of which are incorporated herein by reference.

The invention relates to thermoplastic molding compositions, comprising
A) from 10 to 95% by weight of a thermoplastic polyamide,
B) from 5 to 90% by weight of an acrylate rubber, obtainable via free-radical-initiated aqueous emulsion polymerization of ethylenically unsaturated monomers in the presence of at least one dispersing agent and of at least one free-radical initiator, where the emulsion polymerization uses
from 1 to 50% by weight of an alkene having from 5 to 12 carbon atoms [monomer A], and
from 50 to 99% by weight of an ester based on an α,β-monoethylenically unsaturated mono- or dicarboxylic acid having from 3 to 6 carbon atoms and on an alkanol having from 1 to 12 carbon atoms [monomer B], and also, if appropriate,
up to 10% by weight of an α,β-monoethylenically unsaturated mono- or dicarboxylic acid having from 3 to 6 carbon atoms and/or its amide [monomer C], and
up to 30% by weight of an α,β-ethylenically unsaturated compound different from the monomers A to C [monomer D],
and the monomers A to D give a total of 100% by weight,
C) from 0 to 40% by weight of a copolymer which comprises vinylaromatic monomer units and
D) from 0 to 70% by weight of further additives,
where the total of the percentages by weight of A) to D) is 100%.

The invention also relates to the use of these molding compositions for production of moldings, of fibers, and of foils, and also to the moldings of any type thus obtainable.

Impact-modification of polyamides has been the subject of many studies over a number of years (S. Wu, Polym. Eng. Sci., 27, 335, 1987). In the products available commercially, impact modifiers used are in essence olefin rubbers. For compatibilization with the PA matrix, functionalized olefin rubbers are generally used, examples being EPDM-g-MA, EPR-g-MA, SBS-g-MA (R. Gaymans, in Polymer Blends, Vol 2, 177-224, 2000, Eds. D. R. Paul, C. B. Bucknall).

Core-shell rubbers have hitherto been used rather infrequently for impact-modification of polyamides (C. A. Cruz-Ramos, in Polymer Blends, Vol. 2, 137-175, 2000, Eds. D. R. Paul, C. B. Bucknall), since in particular the acrylate modifiers lose activity by virtue of their glass transition temperature of from about −40° C. to −30° C.

Impact-modified PA molding compositions known hitherto have insufficient UV resistance for many applications.

DE-A 10 2005 046 692.3 proposes a novel process for preparation of emulsion polymers based on acrylate monomers.

It was therefore an object of the present invention to provide thermoplastic molding compositions based on polyamides with high toughness and with improved UV resistance.

Accordingly, the molding compositions defined in the introduction have been found.

Preferred embodiments are given in the subclaims.

The inventive molding compositions comprise, as component A), from 10 to 95% by weight, preferably from 20 to 94% by weight, and in particular from 30 to 85% by weight, of at least one polyamide.

The viscosity number of the polyamides of the inventive molding compositions is generally from 70 to 350 ml/g, pref-

| AB polymers: | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| AA/BB polymers: | |
| PA 46 | Tetramethylenediamine, adipic acid |
| PA 66 | Hexamethylenediamine, adipic acid |

-continued

| | |
|---|---|
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | Nonyldiamine/terephthalic acid |
| PA MXD6 | m-Xylylehediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

According to the invention, the thermoplastic molding compositions comprise, as component B) from 5 to 90% by weight, preferably from 5 to 40% by weight, and in particular from 10 to 30% by weight, of an acrylate rubber, obtainable via free-radical-initiated aqueous emulsion polymerization of ethylenically unsaturated monomers in the presence of at least one dispersing agent and of at least one free-radical initiator, where the emulsion polymerization uses from 1 to 50% by weight of an alkene having from 5 to 12 carbon atoms [monomer A], and from 50 to 99% by weight of an ester based on an α,β-monoethylenically unsaturated mono- or dicarboxylic acid having from 3 to 6 carbon atoms and on an alkanol having from 1 to 12 carbon atoms [monomer B], and also, if appropriate, up to 10% by weight of an α,β-monoethylenically unsaturated mono- or dicarboxylic acid having from 3 to 6 carbon atoms and/or its amide [monomer C], and up to 30% by weight of an α,β-ethylenically unsaturated compound different from the monomers A to C [monomer D], and the monomers A to D give a total of 100% by weight.

The conduct of free-radical-initiated emulsion polymerization reactions of ethylenically unsaturated monomers in an aqueous medium has been widely previously described and is therefore well known to the person skilled in the art [cf. in this connection Emulsion polymerization in Encyclopedia of Polymer Science and Engineering, Vol. 8, pages 659 et seq. (1987); D. C. Blackley, in High Polymer Lattices, Vol. 1, pages 35 et seq. (1966); H. Warson, The Applications of Synthetic Resin Emulsions, chapter 5, pages 246 et seq. (1972); D. Diederich, Chemie in unserer Zeit 24, pages 135-142 (1990); Emulsion Polymerisation, Inter-science Publishers, New York (1965); DE-A 40 03 422, and Dispersionen synthetischer Hochpolymerer, F. Hölscher, Springer-Verlag, Berlin (1969)]. The usual method for free-radical-induced aqueous emulsion polymerization reactions disperses the ethylenically unsaturated monomers in the aqueous medium in the form of monomer droplets with concomitant use of dispersing agents and polymerizes them by means of a free-radical polymerization initiator. The present process differs from this procedure only in the use of a specific monomer composition.

The monomers A used can comprise any of the linear or cyclic alkenes having from 5 to 12 carbon atoms, preferably from 5 to 10 carbon atoms, and particularly preferably from 6 to 8 carbon atoms, where these are capable of free-radical copolymerization and comprise no further elements alongside carbon and hydrogen. Among these are, by way of example, the linear alkenes 2-methyl-1-butene, 3-methyl-1-butene, 3,3-dimethyl-2-isopropyl-1-butene, 2-methyl-2-butene, 3-methyl-2-butene, 1-pentene, 2-methyl-1-pentene, 3-methyl-1-pentene, 4-methyl-1-pentene, 2-pentene, 2-methyl-2-pentene, 3-methyl-2-pentene, 4-methyl-2-pentene, 2-ethyl-1-pentene, 3-ethyl-1-pentene, 4-ethyl-1-pentene, 2-ethyl-2-pentene, 3-ethyl-2-pentene, 4-ethyl-2-pentene, 2,4,4-trimethyl-1-pentene, 2,4,4-trimethyl-2-pentene, 3-ethyl-2-methyl-1-pentene, 3,4,4-trimethyl-2-pentene, 2-methyl-3-ethyl-2-pentene, 1-hexene, 2-methyl-1-hexene, 3-methyl-1-hexene, 4-methyl-1-hexene, 5-methyl-1-hexene, 2-hexene, 2-methyl-2-hexene, 3-methyl-2-hexene, 4-methyl-2-hexene, 5-methyl-2-hexene, 3-hexene, 2-methyl-3-hexene, 3-methyl-3-hexene, 4-methyl-3-hexene, 5-methyl-3-hexene, 2,2-dimethyl-3-hexene, 2,3-dimethyl-2-hexene, 2,5-dimethyl-3-hexene, 2,5-dimethyl-2-hexene, 3,4-dimethyl-1-hexene, 3,4-dimethyl-3-hexene, 5,5-dimethyl-2-hexene, 2,4-dimethyl-1-hexene, 1-heptene, 2-methyl-1-heptene, 3-methyl-1-heptene, 4-methyl-1-heptene, 5-methyl-1-heptene, 6-methyl-1-heptene, 2-heptene, 2-methyl-2-heptene, 3-methyl-2-heptene, 4-methyl-2-heptene, 5-methyl-2-heptene, 6-methyl-2-heptene, 3-heptene, 2-methyl-3-heptene, 3-methyl-3-heptene, 4-methyl-3-heptene, 5-methyl-3-heptene, 6-methyl-3-heptene, 6,6-dimethyl-1-heptene, 3,3-dimethyl-1-heptene, 3,6-dimethyl-1-heptene, 2,6-dimethyl-2-heptene, 2,3-dimethyl-2-heptene, 3,5-dimethyl-2-heptene, 4,5-dimethyl-2-heptene, 4,6-dimethyl-2-heptene, 4-ethyl-3-heptene, 2,6-dimethyl-3-heptene, 4,6-dimethyl-3-heptene, 2,5-dimethyl-4-heptene, 1-octene, 2-methyl-1-octene, 3-methyl-1-octene, 4-methyl-1-octene, 5-methyl-1-octene, 6-methyl-1-octene, 7-methyl-1-octene, 2-octene, 2-methyl-2-octene, 3-methyl-2-octene, 4-methyl-2-octene, 5-methyl-2-octene, 6-methyl-2-octene, 7-methyl-2-octene, 3-octene, 2-methyl-3-octene, 3-methyl-3-octene, 4-methyl-3-octene, 5-methyl-3-octene, 6-methyl-3-octene, 7-methyl-3-octene, 4-octene, 2-methyl-4-octene, 3-methyl-4-octene, 4-methyl-4-octene, 5-methyl-4-octene, 6-methyl-4-octene, 7-methyl-4-octene, 7,7-dimethyl-1-octene, 3,3-dimethyl-1-octene, 4,7-dimethyl-1-octene, 2,7-dimethyl-2-octene, 2,3-dimethyl-2-octene, 3,6-dimethyl-2-octene, 4,5-dimethyl-2-octene, 4,6-dimethyl-2-octene, 4,7-dimethyl-2-octene, 4-ethyl-3-octene, 2,7-dimethyl-3-octene, 4,7-dimethyl-3-octene, 2,5-dimethyl-4-octene, 1-nonene, 2-methyl-1-nonene, 3-methyl-1-nonene, 4-methyl-1-nonene, 5-methyl-1-nonene, 6-methyl-1-nonene, 7-methyl-1-nonene, 8-methyl-1-nonene, 2-nonene, 2-methyl-2-nonene, 3-methyl-2-nonene, 4-methyl-2-nonene, 5-methyl-2-nonene, 6-methyl-2-nonene, 7-methyl-2-nonene, 8-methyl-2-nonene, 3-nonene, 2-methyl-3-nonene, 3-methyl-3-nonene, 4-methyl-3-nonene, 5-methyl-3-nonene, 6-methyl-3-nonene, 7-methyl-3-nonene, 8-methyl-3-nonene, 4-nonene, 2-methyl-4-nonene, 3-methyl-4-nonene, 4-methyl-4-nonene, 5-methyl-4-nonene, 6-methyl-4-nonene, 7-methyl-4-nonene, 8-methyl-4-nonene, 4,8-dimethyl-1-nonene, 4,8-dimethyl-4-nonene, 2,8-dimethyl-4-nonene, 1-decene, 2-methyl-1-decene, 3-methyl-1-decene, 4-methyl-1-decene, 5-methyl-1-decene, 6-methyl-1-decene, 7-methyl-1-decene, 8-methyl-1-decene, 9-methyl-1-decene, 2-decene, 2-methyl-2-decene, 3-methyl-2-decene, 4-methyl-2-decene, 5-methyl-2-decene, 6-methyl-2-decene, 7-methyl-2-decene, 8-methyl-2-decene, 9-methyl-2-decene, 3-decene, 2-methyl 3-decene, 3-methyl-3-decene, 4-methyl-3-decene, 5-methyl-3-decene, 6methyl-3-decene, 7-methyl-3-decene, 8-methyl-3-decene, 9-methyl- 3-decene, 4-decene, 2-methyl-4-decene, 3-methyl-4-decene, 4-methyl-4-decene, 5-methyl-4-decene, 6-methyl-4-decene, 7-methyl-4-decene, 8-methyl-4-decene, 9-methyl-4-decene, 5-decene, 2-methyl-5-decene, 3-methyl-5-decene, 4-methyl-5-decene, 5-methyl-5-decene, 6-methyl-5-decene, 7-methyl-5-decene, 8-methyl-5-decene, 9-methyl-5-decene, 2,4-dimethyl-1-decene, 2,4-dimethyl-2-decene, 4,8-dimethyl-1-decene, 1-undecene, 2-methyl-1-undecene, 3-methyl-1-undecene, 4-methyl-1-undecene, 5-methyl-1-undecene, 6-methyl-1-undecene, 7-methyl-1-undecene, 8-methyl-1-undecene, 9-methyl-1-undecene, 10-methyl-1-undecene, 2-undecene, 2-methyl-2-undecene, 3-methyl-2-undecene, 4-methyl-2-undecene, 5-methyl-2-undecene, 6-methyl-2-undecene, 7-methyl-2-undecene, 8-methyl-2-undecene, 9-methyl-2-undecene, 10-methyl-2-undecene, 3-undecene, 2-methyl-3-undecene, 3-methyl-3-undecene, 4-methyl-3-undecene, 5-methyl-3-undecene, 6-methyl-3-undecene, 7-methyl-3-undecene, 8-methyl-3-undecene, 9-methyl-3-undecene, 10-methyl-3-undecene, 4-undecene, 2-methyl-4-undecene, 3-methyl-4-undecene, 4-methyl-4-undecene, 5-methyl-4-undecene, 6-methyl-4-undecene, 7-methyl-4-undecene, 8-methyl-4-undecene, 9-methyl-4-undecene, 10-methyl-4-undecene, 5-undecene, 2-methyl-5-undecene, 3-methyl-5-undecene, 4-methyl-5-undecene, 5-methyl-5-undecene, 6-methyl-5-undecene, 7-methyl-5-undecene, 8-methyl-5-undecene, 9-methyl-5-undecene, 10-methyl-5-undecene, 1-dodecene, 2-dodecene, 3-dodecene, 4-dodecene, 5-dodecene or 6-dodecene, and also the cyclic alkenes cyclopentene, 2-methyl-1-cyclopentene, 3-methyl-1-cyclopentene, 4-methyl-1-cyclopentene, 3-butyl-1-cyclopentene, vinylcyclopentane, cyclohexene, 2-methyl-1-cyclohexene, 3-methyl-1-cyclohexene, 4-methyl-1-cyclohexene, 1,4-dimethyl-1-cyclohexene, 3,3,5-trimethyl-1-cyclohexene, 4-cyclopentyl-1-cyclohexene, vinylcyclohexane, cycloheptene, 1,2-dimethyl-1-cycloheptene, cyclooctene, 2-methyl-1-cyclooctene, 3-methyl-1-cyclooctene, 4-methyl-1-cyclooctene, 5-methyl-1-cyclooctene, cyclononene, cyclodecene, cycloundecene, cyclododecene, bicyclo[2.2.1]-2-heptene, 5-ethylbicyclo[2.2.1]-2-heptene, 2-methylbicyclo[2.2.2]-2-octene, bicyclo[3.3.1]-2-nonene, or bicyclo[3.2.2]-6-nonene.

It is preferable to use the 1-alkenes, such as 1-pentene, 1-hexene, 1-heptene, 1-octene, 1-nonene, 1-decene, 1-undecene, 1-dodecene, 2,4,4-trimethyl-1-pentene, 2,4-dimethyl-1-hexene, 6,6-dimethyl-1-heptene, or 2-methyl-1-octene. An alkene having from 6 to 8 carbon atoms is advantageously used as monomer A, preference being given to a 1-alkene having from 6 to 8 carbon atoms. 1-Hexene, 1-heptene or 1-octene is particularly preferably used. It is, of course, also possible to use mixtures of abovementioned monomers A.

Monomers B used comprise esters based on an α,β-monoethylenically unsaturated mono- or dicarboxylic acid having from 3 to 6 carbon atoms, in particular 3 or 4 carbon atoms, particular examples being acrylic acid, methacrylic acid, maleic acid, fumaric acid, and itaconic acid, and on an alkanol having from 1 to 12 carbon atoms, preferably on an alkanol having from 1 to 8 carbon atoms, and in particular on an alkanol having from 1 to 4 carbon atoms, particular examples being methanol, ethanol, n-propanol, isopropanol, n-butanol, 2-methyl-1-propanol, tert-butanol, n-pentanol, 3-methyl-1-butanol, n-hexanol, 4-methyl-1-pentanol, n-heptanol, 5-methyl-1-hexanol, n-octanol, 6-methyl-1-heptanol, n-nonanol, 7-methyl-1-octanol, n-decanol, 8-methyl-1-nonanol, n-dodecanol, 9-methyl-1-decanol, and 2-ethyl-1-hexanol. It is preferable to use the methyl, ethyl, n-butyl, isobutyl, pentyl, hexyl, heptyl, octyl, nonyl, decyl, 2-ethylhexyl, or dodecyl ester of acrylic acid or of methacrylic acid, or to use the dimethyl or di-n-butyl ester of fumaric acid or of maleic acid. It is, of course, also possible to use mixtures of abovementioned esters.

The monomers C optionally used comprise α,β-monoethylenically unsaturated mono- or dicarboxylic acids having from 3 to 6 carbon atoms and/or their amides, particular examples being acrylic acid, methacrylic acid, maleic acid, fumaric acid or itaconic acid, or acrylamide or methacrylamide. It is, of course, also possible to use mixtures of abovementioned monomers C.

Examples of monomers D used, which differ from the monomers A to C, are α,β-ethylenically unsaturated compounds such as vinylaromatic monomers, e.g. styrene, α-methylstyrene, o-chlorostyrene or vinyltoluenes, vinyl halides, such as vinyl chloride or vinylidene chloride, esters composed of vinyl alcohol and of monocarboxylic acids which have from 1 to 18 carbon atoms, e.g. vinyl acetate, vinyl propionate, vinyl n-butyrate, vinyl laurate, and vinyl stearate, nitriles of α,β-mono- or diethylenically unsaturated carboxylic acids, e.g. acrylonitrile, methacrylonitrile, fumaronitrile, maleonitrile, and also conjugated dienes which have from 4 to 8 carbon atoms, e.g. 1,3-butadiene and isoprene, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, or 2-(1-imidazolin-2-onyl)ethyl methacrylate. Other monomers D have at least one epoxy, hydroxy, N-methylol, or carbonyl group, or at least two non-conjugated ethylenically unsaturated double bonds. Examples here are monomers having two vinyl radicals, monomers having two vinylidene radicals, and also monomers having two alkenyl radicals. Particularly advantageous compounds here are the diesters of dihydric alcohols with α,β-monoethylenically unsaturated monocarboxylic acids, among which preference is given to acrylic and methacrylic acid. Examples of these monomers having two non-conjugated ethylenically unsaturated double bonds are alkylene glycol diacrylates and alkylene glycol dimethacrylates, e.g. ethylene glycol diacrylate, propylene 1,2-glycol diacrylate, propylene 1,3-glycol diacrylate, butylene 1,3-glycol diacrylate, butylene 1,4-glycol diacrylates, and ethylene glycol dimethacrylate, propylene 1,2-glycol dimethacrylate, propylene 1,3-glycol dimethacrylate, butylene 1,3-glycol dimethacrylate, butylene 1,4-glycol dimethacrylate, and also divinylbenzene; vinyl methacrylate, vinyl acrylate, allyl methacrylate, allyl acrylate, diallyl maleate, diallyl fumarate, methylenebisacrylamide, cyclopentadienyl acrylate, triallyl cyanurate, or triallyl isocyanurate. In this connection, other compounds of particular importance are the $C_1$-$C_8$-hydroxyalkyl esters of methacrylic acid and of acrylic acid, examples being n-hydroxy ethyl acrylate, n-hydroxypropyl acrylate, or n-hydroxybutyl acrylate, and n-hydroxyethyl methacrylate, n-hydroxypropyl methacrylate, or n-hydroxybutyl methacrylate, and also compounds such as glycidyl acrylate or glycidyl methacrylate, diacetonacrylamide, and acetylacetoxyethylacrylate and the corresponding methacrylate. It is, of course, also possible to use mixtures of monomers D.

However, for the free-radical-initiated aqueous emulsion polymerization reaction it is preferable to use
from 1 to 49.99% by weight of monomers A, and
from 50 to 98.99% by weight of monomers B, and also
from 0.01 to 10% by weight of monomers C.

Particular monomers A used are 1-pentene, 1-hexene, 1-heptene, 1-octene, 3-methyl-1-hexene, 3-methyl-1-heptene, and/or 3-methyl-1-octene, and particular compounds used as monomers B are n-butyl acrylate, methyl acrylate, 2-ethylhexyl acrylate, methyl methacrylate, and/or tert-butyl acrylate, and particular compounds used as monomers C are acrylic acid, methacrylic acid, and/or itaconic acid.

Compounds particularly preferably used for the free-radical-initiated aqueous emulsion polymerization reaction are from 5 to 40% by weight of 1-pentene, 1-hexene, and/or 1-octene [monomers A], and from 56 to 94.9% by weight of n-butyl acrylate, methyl acrylate, 2-ethylhexyl acrylate, methyl methacrylate and/or tert-butyl acrylate [monomers B], and also from 0.1 to 4% by weight of acrylic acid and/or methacrylic acid [monomers C].

At least some of the amount of the monomers A to D can always be used here as an initial charge in the aqueous reaction medium, and any remaining residual amount can be added to the aqueous reaction medium after initiation of the free-radical polymerization reaction, batchwise in one portion, batchwise in a plurality of portions, or else continuously with constant or changing flow rates. However, it is also possible to use at least some of the amount of the free-radical polymerization initiator as initial charge in the aqueous reaction medium, and to heat the resultant aqueous reaction medium to polymerization temperature, and at this temperature to add the monomers A to D to the aqueous reaction medium batchwise in one portion, batchwise in a plurality of portions, or else continuously with constant or changing flow rates. In a particularly advantageous method, the monomers A to D are added to the aqueous reaction medium in the form of a mixture. It is advantageous to add the monomers A to D in the form of an aqueous monomer emulsion.

According to the invention, for the purposes of the present process, dispersing agents are used concomitantly, these keeping not only the monomer droplets but also the polymer particles formed in dispersion in the aqueous medium and ensuring that the aqueous polymer dispersion produced has stability. Dispersing agents that can be used are not only the protective colloids usually used for conduct of free-radical aqueous emulsion polymerization reactions but also emulsifiers.

Examples of suitable protective colloids are polyvinyl alcohols, polyalkylene glycols, the alkali metal salts of polyacrylic acids and polymethacrylic acids, gelatin derivatives, or copolymers comprising acrylic acid, methacrylic acid, maleic anhydride, 2-acrylamido-2-methylpropanesulfonic acid, and/or 4-styrenesulfonic acid, and the alkali metal salts of these copolymers, and also homo- and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amine-group-bearing acrylates, methacrylates, acrylamides, and/or methacrylamides. Houben-Weyl, Methoden der organischen Chemie [Methods of organic chemistry], volume XIV/1, Makromolekulare Stoffe [Macromolecular substances], Georg-Thieme-Verlag, Stuttgart, 1961, pages 411 to 420 gives a detailed description of other suitable protective colloids.

It is, of course, also possible to use a mixture composed of protective colloids and/or of emulsifiers. The dispersing agents used often comprise exclusively emulsifiers whose relative molecular weights, unlike those of the protective colloids, are usually below 1000. They can be either anionic, cationic, or non-ionic. If mixtures of surfactants are used, the individual components must, of course, be compatible with one another, and a few preliminary experiments can be used to check this in case of doubt. Anionic emulsifiers are generally compatible with one another and with non-ionic emulsifiers. The same also applies to cationic emulsifiers, while anionic and cationic emulsifiers are mostly not compatible with one another. Houben-Weyl, Methoden der organischen Chemie [Methods of organic chemistry], volume XIV/1, Makromolekulare Stoffe [Macromolecular substances], Georg-Thieme-Verlag, Stuttgart, 1961, pages 192 to 208 gives an overview of suitable emulsifiers.

According to the invention, however, emulsifiers are particularly used as dispersing agents.

Examples of frequently used nonionic emulsifiers are ethoxylated mono-, di- and trialkylphenols (EO number: from 3 to 50, alkyl radical: $C_4$-$C_{12}$), and also ethoxylated fatty alcohols (EO number: from 3 to 80, alkyl radical: $C_8$-$C_{36}$). Examples of these are Lutensol® A grades ($C_{12}$-$C_{14}$ fatty alcohol ethoxylates, EO number: from 3 to 8), Lutensol® AO grades ($C_{13}$-$C_{15}$ oxo alcohol ethoxylates, EO number: from 3 to 30), Lutensol® AT grades ($C_{16}$-$C_{18}$ fatty alcohol ethoxylates, EO number: from 11 to 80), Lutensol® ON grades ($C_{10}$ oxo alcohol ethoxylates, EO number: from 3 to 11) and Lutensol® TO grades ($C_{13}$ oxo alcohol ethoxylates, EO number: from 3 to 20) from BASF AG.

Examples of usual anionic emulsifiers are the alkali metal and ammonium salts of alkyl sulfates (alkyl radical: $C_8$-$C_{12}$), of sulfuric half-esters of ethoxylated alkanols (EO number: from 4 to 30, alkyl radical: $C_{12}$-$C_{18}$) and of ethoxylated alkylphenols (EO number: from 3 to 50, alkyl radical: $C_4$-$C_{12}$), of alkylsulfonic acids (alkyl radical: $C_{12}$-$C_{18}$) and of alkylarylsulfonic acids (alkyl radical: $C_9$-$C_{18}$).

Other anionic emulsifiers which have proven suitable are compounds of the formula (I)

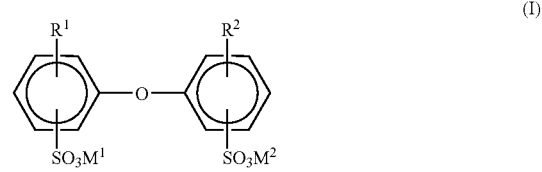

where $R^1$ and $R^2$ are H or $C_4$-$C_{24}$-alkyl, but not simultaneously hydrogen, and $M^1$ and $M^2$ may be alkali metal ions and/or ammonium ions. In the general formula (I) $R^1$ and $R^2$ are preferably linear or branched alkyl radicals having from 6 to 18 carbon atoms, in particular having 6, 12 or 16 carbon atoms, or hydrogen, but $R^1$ and $R^2$ are not simultaneously H. $M^1$ and $M^2$ are preferably sodium, potassium or ammonium, particularly preferably sodium. Particularly advantageous compounds (I) are those where $M^1$ and $M^2$ are sodium, $R^1$ is a branched alkyl radical having 12 carbon atoms and $R^2$ is H or $R^1$. Use is frequently made of technical mixtures which have from 50 to 90% by weight content of the monoalkylated product, for example Dowfax® 2A1 (trademark of Dow Chemical Company). The compounds (I) are well known, e.g. from U.S. Pat. No. 4,269,749, and are available commercially.

Suitable cationic emulsifiers are generally $C_6$-$C_{18}$-alkyl-bearing or $C_6$-$C_{18}$-aralkyl-bearing or heterocyclic-radical-bearing primary, secondary, tertiary or quaternary ammonium salts, alkanolammonium salts, pyridinium salts, imidazolinium salts, oxazolinium salts, morpholinium salts, thiazolinium salts, or else salts of amine oxides, or are quinolinium salts, isoquinolinium salts, tropylium salts, sulfonium salts or phosphonium salts. Examples of these are dodecylammonium acetate and the corresponding sulfate, the sulfates or acetates of the various 2-(N,N,N-trimethyl-ammonium)ethyl paraffinates, N-cetylpyridinium sulfate, N-laurylpyridinium sulfate, and also N-cetyl-N,N,N-trimethyl ammonium sulfate, N-dodecyl-N,N,N-trimethylammonium sulfate, N-octyl-N,N,N-trimethylammonium sulfate, N,N-distearyl-N,N-dimethylammonium sulfate, and also the gemini surfactant N,N'-(lauryldimethyl)ethylenediamine disulfate, ethoxylated tallow fatty alkyl-N-methylammonium sulfate, and ethoxylated oleylamine (for example Uniperol® AC from BASF AG, about 12 ethylene oxide units). Numerous other examples are found in H. Stache, Tensid-Taschenbuch, Carl-Hanser-Veriag, Munich, Vienna, 1981 and in McCutcheon's, Emulsifiers & Detergents, MC Publishing Company, Glen Rock, 1989. It is advantageous that the anionic counter-groups have minimum nucleophilicity, examples being perchlorate, sulfate, phosphate, nitrate, and carboxylates, such as acetate, trifluoroacetate, trichloroacetate, propionate, oxalate, citrate, benzoate, and also conjugated anions of organosulfonic acids, e.g. methylsulfonate, trifluoromethylsulfonate, and para-toluenesulfonate, and also tetrafluoroborate, tetraphenylborate, tetrakis(pentafluorophenyl)borate, tetrakis[bis(3,5-trifluoromethyl)phenyl]borate, hexafluorophosphate, hexafluoroarsenate, or hexafluoroantimonate.

The total amount used of the emulsifiers preferably used as dispersing agents is, in each case based on the total amount of monomer, advantageously ≧0.005 and ≦10% by weight, preferably ≧0.01 and ≦5% by weight, in particular ≧0.1 and ≦3% by weight.

The total amount of the protective colloids used as dispersing agents in addition to or instead of the emulsifiers, in each case based on the total amount of monomer, is often ≧0.1 and ≦10% by weight and frequently ≧0.2 and ≦7% by weight.

However, it is preferable that anionic and/or non-ionic emulsifiers, and particularly preferably anionic emulsifiers, are used as dispersing agents.

The free-radical-initiated aqueous emulsion polymerization is initiated by means of a free-radical polymerization initiator (free-radical initiator). In principle, these can be either peroxides or azo compounds. Redox initiator systems can, of course, also be used. Peroxides that can in principle be used are inorganic peroxides, such as hydrogen peroxide or peroxodisulfates, such as the mono- or di-alkali-metal or ammonium salts of peroxodisulfuric acid, e.g. its mono- and disodium, -potassium, or ammonium salts, or organic peroxides, such as alkyl hydroperoxides, e.g. tert-butyl, p-menthyl, or cumyl hydroperoxide, and also dialkyl or diaryl peroxides, such as di-tert-butyl or dicumyl peroxide. The azo compound used in essence comprises 2,2'-azobis(isobutyronitrile), 2,2'-azobis(2,4-dimethylvaleronitrile), and 2,2'-azobis(amidinopropyl)dihydrochloride (AIBA, corresponding to V-50 from Wako Chemicals). Oxidants used for redox initiator systems are in essence the abovementioned peroxides. The corresponding reducing agents used can comprise sulfur compounds with a low oxidation state, e.g. alkali metal sulfites, such as potassium sulfite and/or sodium sulfite, alkali metal hydrogensulfites, such as potassium hydrogensulfite and/or sodium hydrogensulfite, alkali metal metabisulfites, such as potassium metabisulfite and/or sodium metabisulfite, formaldehyde sulfoxylates, such as potassium formaldehyde-sulfoxylate and/or sodium formaldehyde-sulfoxylate, alkali metal salts, specifically the potassium and/or sodium salts of aliphatic sulfinic acids, and alkali metal hydrogensulfides, such as potassium hydrogensulfide and/or sodium hydrogensulfide, salts of polyvalent metals, e.g. ferrous sulfate, ferrous ammonium sulfate, ferrous phosphate, enediols, such as dihydroxymaleic acid, benzoin, and/or ascorbic acid, and also reducing saccharides, such as sorbose, glucose, fructose, and/or dihydroxyacetone. The amount of the free-radical initiator used, based on the total amount of monomer, is generally from 0.01 to 5% by weight, preferably from 0.1 to 3% by weight, and particularly preferably from 0.2 to 1.5% by weight.

According to the invention, the entire amount of the free-radical initiator can be used as an initial charge in the aqueous reaction medium. However, it is also possible, if appropriate, to use merely a portion of the free-radical initiator as an initial charge in the aqueous reaction medium and then, during the inventive free-radical emulsion polymerization, to add the entire amount or any remaining residual amount, as required by consumption, continuously or batchwise.

The entire range from 0 to 170° C. can be used as reaction temperature for the inventive free-radical aqueous emulsion polymerization. Temperatures used here are generally from 50 to 120° C., frequently from 60 to 110° C., and often from 70 to 100° C. The inventive free-radical aqueous emulsion polymerization can be carried out at a pressure smaller than, equal to, or greater than 1 bar (absolute), and the polymerization temperature can therefore exceed 100° C. and can be up to 170° C. It is preferable to use superatmospheric pressure for polymerizing volatile monomers, such as 2-methyl-1-butene, 3-methyl-1-butene, 2-methyl-2-butene, butadiene, or vinyl chloride. The pressure here can assume values of 1.2, 1.5, 2, 5, 10, 15 bar, or even higher values. If emulsion polymerizations are carried out at subatmospheric pressure, the pressures set are 950 mbar, frequently 900 mbar, and often 850 mbar (absolute). The inventive free-radical aqueous emulsion polymerization is advantageously carried out at 1 atm (1.01 bar absolute) under inert gas, for example under nitrogen or argon.

In principle, the aqueous reaction medium can also comprise subordinate amounts of water-soluble organic solvents, such as methanol, ethanol, isopropanol, butanols, pentanols, or else acetone, etc. However, the inventive process is preferably carried out in the absence of such solvents.

Alongside the abovementioned components, it is also possible and optional to use free-radical chain-transfer compounds, in order to reduce or control the molecular weight of the polymers obtainable via the polymerization. Compounds used here are in essence aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary, or tertiary aliphatic thiols, e.g. ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as 2-hydroxyethanethiol, aromatic thiols, such as benzenethiol, ortho-, meta-, or para-methylbenzenethiol, and also all of the other sulfur compounds described in Polymer Handbook $3^{rd}$ edition, 1989, J. Brandrup and E. H. Immergut, John Wiley & Sons, Section II, pages 133-141, and also aliphatic and/or aromatic aldehydes, such as acetaldehyde, propionaldehyde, and/or benzaldehyde, unsaturated fatty acids, such as oleic acid, dienes having unconjugated double bonds, e.g. divinylmethane or vinylcyclohexane, or hydrocarbons having readily abstractable hydrogen atoms, e.g. toluene. However, it is also possible to use a mixture of above-mentioned free-radical chain-transfer compounds which do not interfere with one another.

The entire amount of the free-radical chain-transfer compounds optionally used based on the total amount of monomer, is generally ≦5% by weight, often ≦3% by weight, and frequently ≦1% by weight.

It is advantageous that a portion or the entire amount of the optionally used free-radical chain-transfer compound is added to the reaction medium prior to initiation of the free-radical polymerization. Furthermore, advantageously, a portion or the entire amount of the free-radical chain-transfer compound can be added to the aqueous reaction medium together with the monomers A to D during the polymerization.

The polymers obtainable by the inventive process can in principle have glass transition temperatures in the range from −70 to +150° C., often from −30 to +100° C., and frequently from −20 to +50° C. The selection of the monomers A to D is frequently such that polymers are formed whose $T_g$ value is ≦+10° C., ≦0° C., ≦−10° C., ≦−20° C., ≦−30° C., ≦−40° C., or ≦−50° C. However, it is also possible to prepare polymers whose glass transition temperatures are from −70 to +10° C., from −60 to −10° C., or from −50 to −20° C. The glass transition temperature here is the midpoint temperature to ASTM D3418-82, determined via differential scanning calorimetry (DSC) [cf. also Ullmann's Encyclopedia of Industrial Chemistry, page 169, Verlag Chemie, Weinheim, 1992, and Zosel in Farbe und Lack, 82, pages 125-134, 1976].

According to Fox (T. G. Fox, Bull. Am. Phys. Soc. 1956 [Ser. II] 1, page 123, and according to Ullmann's Encyclopädie der technischen Chemie [Ullmann's Encyclopedia of Industrial Chemistry], vol. 19, page 18, 4th edition, Verlag Chemie, Weinheim, 1980) a good approximation of the glass transition temperature of copolymers with at most weak crosslinking is given by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n, and $T_g^1, T_g^2 \ldots T_g^n$ are the glass transition temperatures, in degrees Kelvin, of the respective polymers composed in each case only of one of the monomers 1, 2, ... n. The glass transition temperatures of these homopolymers of most ethylenically unsaturated monomers are known (or can easily be determined experimentally in a manner known per se), and are listed by way of example in J. Brandrup, E. H. Immergut, Polymer Handbook 1st Ed. J. Wiley, New York, 1966, 2nd Ed. J. Wiley, New York, 1975, and 3rd Ed. J. Wiley, New York, 1989, and also in Ullmann's Encyclopedia of Industrial Chemistry, page 169, Verlag Chemie, Weinheim, 1992.

The free-radical-initiated aqueous emulsion polymerization can optionally also be carried out in the presence of a polymer seed, for example in the presence of from 0.01 to 3% by weight, frequently from 0.02 to 2% by weight, and often from 0.04 to 1.5% by weight, of a polymer seed, based in each case on the total amount of monomer.

A polymer seed is used in particular when the size of the polymer particles to be prepared by means of aqueous free-radical emulsion polymerization is to be set in a controlled manner (in which connection see by way of example U.S. Pat. No. 2,520,959 and U.S. Pat. No. 3,397,165).

A particular polymer seed used has polymer seed particles with narrow particle size distribution and with weight-average diameter $D_w \leq 100$ nm, frequently ≧5 nm to ≦50 nm, and often ≧15 nm to ≦35 nm. The method for determining weight-average particle diameter is known to the person skilled in the art and by way of example uses the analytical ultracentrifuge method. Herein, weight-average particle diameter means the weight-average $D_{w50}$ value determined by the analytical ultracentrifuge method (cf. in this connection S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147-175).

For the purposes of this specification, narrow particle size distribution means that the ratio of the weight-average particle diameter $D_{w50}$ to the number-average particle diameter $D_{N50}$ [$D_{w50}/D_{N50}$] is ≦2.0, preferably ≦1.5, and particularly preferably ≦1.2 or ≦1.1, determined by the analytical ultracentrifuge method.

The form in which the polymer seed is used is usually that of an aqueous polymer dispersion. In this case, the above-mentioned quantitative data are based on the polymer solids content of the aqueous polymer seed dispersion; they are therefore stated in terms of parts by weight of polymer seed solids, based on the total amount of monomer.

If a polymer seed is used, it is advantageous to use a foreign polymer seed. Unlike in what is known as in-situ polymer seed, which is prepared prior to the start of the actual emulsion polymerization in the reaction vessel, and whose monomeric constitution is the same as that of the polymer prepared via the subsequent free-radical-initiated aqueous emulsion polymerization, a foreign polymer seed is a polymer seed which has been prepared in a separate reaction step and whose monomeric constitution differs from that of the polymer prepared via the free-radical-initiated aqueous emulsion polymerization. This simply means that different monomers or monomer mixtures with different constitution are used for preparation of the foreign polymer seed and for preparation of the aqueous polymer dispersion. Preparation of a foreign polymer seed is familiar to the person skilled in the art, and usually proceeds by using a relatively small amount of monomers and a relatively large amount of emulsifiers as initial charge in a reaction vessel and adding a sufficient amount of polymerization initiator at reaction temperature.

According to the invention, it is preferable to use a foreign polymer seed whose glass transition temperature is ≧50° C., frequently ≧60° C. or ≧70° C., and often ≧80° C. or ≧90° C. Particular preference is given to a polystyrene polymer seed or a polymethyl methacrylate polymer seed.

The entire amount of foreign polymer seed can be used as initial charge prior to the start of addition of the monomers A to D in the reaction vessel. However, it is also possible to use merely some of the amount of the foreign polymer seed as initial charge prior to the start of addition of the monomers A to D in the reaction vessel, and to add the remaining amount during the polymerization. However, it is also possible, if required, to add the entire amount of polymer seed during the course of the polymerization. It is preferable that the entire amount of foreign polymer seed is used as initial charge prior to the start of addition of the monomers A to D in the reaction vessel.

The usual polymer solids content of the aqueous polymer dispersion obtained according to the invention is usually ≧10 and ≦80% by weight, frequently ≧20 and ≦70% by weight, and often ≧25 and ≦60% by weight, based in each case on the aqueous polymer dispersion. The number-average particle diameter (cumulant z-average) determined by way of quasi-elastic light scattering (ISO standard 13 321) is generally from 10 to 2000 nm, frequently from 20 to 1000 nm, and often from 100 to 700 nm or from 100 to 400 nm.

Chemical and/or physical methods likewise known to the person skilled in the art are frequently used on the resultant aqueous polymer dispersions, in order to reduce residual contents of unreacted monomers and of other low-boiling-point compounds [cf. by way of example EP-A 771328, DE-A 196 24 299, DE-A 196 21 027, DE-A 197 41 184, DE-A 197 41 187, DE-A 198 05 122, DE-A 198 28 183, DE-A 198 39 199, DE-A 198 40 586, and 198 47 115].

However, it is also possible to incorporate component B) without solvent during, compounding with A) and this means that the solvent is removed and the solid is incorporated.

The inventive molding compositions comprise, as component C, from 0 to 40% by weight, preferably from 1 to 30% by weight, and in particular from 1 to 15% by weight, based on the total weight of the molding compositions, of a copolymer, or a mixture composed of two or more different copolymers, these comprising vinylaromatic monomers. Preference is given to copolymers based on styrene or on unsubstituted styrenes and on unsaturated nitriles.

Particularly preferred inventive molding compositions comprise proportions of from 2 to 50% by weight of component C, based on the total weight of the molding compositions.

Copolymers that can be used are not only random copolymers but also block copolymers. Examples of suitable copolymers are polystyrene-co-acrylonitrile or terpolymers based on styrene, acrylonitrile, and N-phenylmaleimide or copolymers comprising oxazoline groups.

The copolymers C are particularly preferably composed of
$c_1$) from 60 to 95% by weight, preferably from 65 to 85% by weight, of styrene or of substituted styrenes of the general formula I, or a mixture of these, and
$c_2$) from 5 to 40% by weight, preferably from 15 to 35% by weight, of at least one unsaturated nitrile, preferably acrylonitrile or methacrylonitrile, or a mixture of these.

The copolymers C are resin-like, thermoplastic, and rubber-free. Particularly preferred copolymers C are those composed of styrene and acrylonitrile, composed of α-methylstyrene and acrylonitrile, or composed of styrene, α-methylstyrene, and acrylonitrile.

These copolymers are frequently produced as by-products during graft polymerization for preparation of component B, particularly when large amounts of monomers are grafted onto small amounts of rubber.

The copolymers C are known per se and can be prepared via free-radical polymerization, in particular via emulsion, suspension, solution, or bulk polymerization. Their viscosity numbers are in the range from 40 to 160 ml/g, preferably from 60 to 110 ml/g (measured in 0.5% strength by weight solution in dimethylformamide at 23° C.), which corresponds to average (weight-average) molecular weights $M_w$ of from 40 000 to 2 000 000.

In one of the preferred embodiments, the copolymers C are based on a vinylaromatic compound (c1) and comprise, as units (c2), dicarboxylic anhydrides (c21) or dicarboximides (c22), or a mixture composed of c21) and c22), and units (c3) which derive from further monomers which comprise no groups that react with the end groups of the polyamide, or only much more slowly.

According to this embodiment, the proportion of the units c1) is preferably from 50 to 85% by weight, in particular from 60 to 80% by weight. The copolymers C) very particularly preferably comprise from 65 to 78% by weight of units which derive from aromatic vinyl compounds. The % by weight data are always based on the total weight of c1) to c3).

The proportion of the units c21) which derive from α,β-unsaturated dicarboxylic anhydrides is preferably from 0.3 to 25% by weight. Copolymers C) having substantially less than 0.3% by weight of the units c21), for example those having less than 0.1% by weight of these units, generally lack sufficient reactivity. Those having substantially more than 25% by weight mostly become difficult to process because their crosslinking activity is too high. The copolymers C) preferably comprise from 0.5 to 15% by weight, in particular from 0.7 to 10% by weight, very particularly preferably from 0.8 to 5% by weight, of c21), for example from 1 to 3% by weight of c21). The % by weight data here are in each case based on the total weight of the units c1) to c3).

Instead of the units c21) or, as is preferred, in addition thereto, the copolymers C) may comprise units c22) which derive from α,β unsaturated, in particular cyclic dicarboxylic imides. These are generally present at from 0 to 49.7% by weight in the copolymers C). Preferred copolymers C) comprise from 0 to 39.5% by weight of c22), in particular from 0 to 34.2% by weight, the % by weight data being based in each case on the total weight of the units c1) to c3).

If the copolymers C do not comprise c22), the copolymers C) may moreover also comprise from 14.7 to 40% by weight, preferably from 19.5 to 35% by weight, in particular from 21.3 to 33% by weight, based on the total weight of the units c1) to c3), of units c3) which derive from other compounds capable of free-radical polymerization.

Particular aromatic vinyl compounds c1) which may be used are styrene and styrene derivatives. Among the suitable styrene derivatives are α-methylstyrene and styrene derivatives substituted on the aromatic ring, for example vinyltoluene, tert-butylstyrene, or chlorostyrene. It is, of course, also possible to use a mixture of different aromatic vinyl compounds. It is very particularly preferable to use styrene.

Among the preferred α,β-unsaturated dicarboxylic anhydrides c21) are cyclic compounds, specifically those having from 2 to 20 carbon atoms. The double bond may be either exocyclic or endocyclic. Among these compounds, particular preference is given to maleic anhydride, methylmaleic anhydride, or itaconic anhydride. It is also possible to use a mixture of various dicarboxylic anhydrides. It is very particularly preferable to use maleic anhydride alone.

The α,β unsaturated dicarboxylic imides c22) generally correspond to the abovementioned dicarboxylic anhydrides. The substituent on the nitrogen is generally a $C_1$-$C_{20}$-alkyl, $C_4$-$C_{20}$-cycloalkyl, $C_1$-$C_{10}$-alkyl-$C_6$-$C_{18}$-aryl, or a $C_6$-$C_{18}$-aryl radical.

The alkyl radicals may be either linear or branched and may have interruption by one or more oxygen atoms, there being no direct linking of the oxygen atoms to the nitrogen atoms or to another oxygen atom. Among these alkyl radicals are methyl, ethyl, n-propyl, isopropyl, n-butyl, isobutyl, tert-butyl, n-hexyl, n-decyl, and n-dodecyl. The cycloalkyl radicals may be either unsubstituted or substituted. Examples of suitable substituents are alkyl groups, such as methyl or ethyl. Examples which may be mentioned of cycloalkyl radicals are cyclobutyl, cyclopentyl, cyclohexyl, and p-methylcyclohexyl. The alkyl group of the alkylaryl radicals may be either linear or branched, and the alkylaryl radicals may also have substituents. Examples of these substituents are alkyl groups, such as methyl or ethyl, or else halogen atoms, such as chlorine or bromine. Examples of alkylaryl radicals which may be used are benzyl, ethylphenyl, or p-chlorobenzyl. The aryl radicals may also be substituted or unsubstituted, examples of suitable substituents being alkyl groups, such as methyl or ethyl, or halogen atoms, such as chlorine or bromine. Among the preferred aryl radicals are phenyl and naphthyl. Very particularly preferred radicals are cyclohexyl or phenyl.

By way of example of units c3), mention may be made here of acrylic acid and acrylic acid derivatives, such as methacrylic acid, alkyl acrylates, such as ethyl acrylate, methyl methacrylate, ethyl methacrylate, or cyclohexyl methacrylate, or unsaturated nitrites, such as acrylonitrile, methacrylonitrile. Mixtures of these monomers may likewise be used. It is very particularly preferable to use acrylonitrile alone.

By way of example of preferred copolymers C) for this embodiment, mention may be made of those having the following composition:

Copolymers which comprise c1) from 50 to 85% by weight, preferably from 60 to 81% by weight, of styrene, c2) from 0.5 to 10% by weight, preferably from 1 to 5% by weight, of maleic anhydride, and c3) from 14.5 to 40% by weight, preferably from 18 to 35% by weight, of acrylonitrile, where the proportions of c1) to c3) give a total of 100% by weight.

The copolymers C) for this embodiment preferably comprise the units c1) to c3) with random distribution. The molar masses $M_w$ (weight-average) of the copolymers C) are generally from 30 000 to 500 000 g/mol, preferably from 50 000 to 250 000 g/mol, in particular from 70 000 to 200 000 g/mol, determined by means of GPC using tetrahydrofuran (THF) as eluent and polystyrene calibration.

The copolymers C) for this embodiment may, by way of example, be prepared by free-radical polymerization of the corresponding monomers. This reaction may be carried out either in suspension or in emulsion, or else in solution or in bulk, the latter being preferred. The free-radical reaction may generally be initiated using the usual methods, for example light, or preferably using free-radical initiators, such as peroxides, e.g. benzoyl peroxide. Thermally initiated polymerization is also possible.

Another method of preparing the copolymers C) for this embodiment first reacts components c1), c21), and, if appropriate, c3) with one another in a free-radical reaction, and then converts some of the anhydride groups present within the reaction product into imide groups, using appropriate primary amines or ammonia, thus producing the units c22). This reaction is generally executed in the presence of a tertiary amine as catalyst at temperatures of from 80 to 350° C.

In another preferred embodiment, the copolymers C) comprise, instead of the units c21) or c22) or a mixture of these, units (c23) which derive from an unsaturated monomer which comprises an epoxy group. The units c23) may also be based on a mixture of two or more different monomers of this type. The monomers may have one, or else two or more, epoxy groups. It is particularly preferable to use glycidyl methacrylate alone.

Among the preferred copolymers C) for this embodiment are:

Copolymers comprising c1) from 65 to 85% by weight, preferably from 70 to 80% by weight, of styrene, c23) from 0.5 to 10% by weight, preferably from 1 to 5% by weight, of glycidyl methacrylate, and c3) from 14.5 to 34.5% by weight, preferably from 19 to 29% by weight, of acrylonitrile, where the proportions of c1) to c3) give a total of 100% by weight.

The copolymers C) for this embodiment may, for example, be prepared by suspension polymerization in polyvinyl alcohol in the presence of a peroxidic initiator.

The copolymers C) for this embodiment generally have molar masses (weight-average $M_w$) in the range from 50 000 to 1 000 000 g/mol, preferably from 70 000 to 500 000 g/mol, determined by GPC using THF as eluent, against a polystyrene standard.

The inventive molding compositions can comprise, as components D), from 0 to 70% by weight, preferably up to 40% by weight, of further additives.

The inventive molding compositions can comprise, as component D), from 0 to 3% by weight, preferably from 0.05 to 3% by weight, with preference from 0.1 to 1.5% by weight, and in particular from 0.1 to 1% by weight, of a lubricant.

Preference is given to the Al, alkali metal, or alkaline earth metal salts, or esters or amides of fatty acids having from 10 to 44 carbon atoms, preferably having from 14 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The inventive molding compositions can comprise, as other components D), heat stabilizers or antioxidants, or a mixture of these, selected from the group of the copper compounds, sterically hindered phenols, sterically hindered aliphatic amines, and/or aromatic amines.

The inventive molding compositions comprise from 0.05 to 3% by weight, preferably from 0.1 to 1.5% by weight, and in particular from 0.1 to 1% by weight, of copper compounds, preferably in the form of Cu(I) halide, in particular in a mixture with an alkali metal halide, preferably KI, in particular in the ratio 1:4, or of a sterically hindered phenol or of an amine stabilizer, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogenous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols are in principle any of the compounds having a phenolic structure and having at least one bulky group on the phenolic ring.

By way of example, compounds of the formula

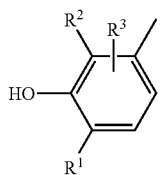

can preferably be used, in which:
$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is those derived from substituted benzenecarboxylic acids, in particular from substituted benzenepropionic acids.

Particularly preferred compounds from this class are compounds of the formula

All of the following should be mentioned as examples of sterically hindered phenols:
2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxy-phenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydro-cinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis (2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl]propionate (Irganox® 259), pentaerythrityl tetrakis[3-(3,5-di-tert-butyl-4-hydroxyphenyl)propionate], and also N,N'-hexamethylene-bis-3,5-di-tert-butyl-4-hydroxyhydrocinnamide (Irganox® 1098), and the product Irganox® 245 described above from Ciba Geigy, which has particularly good suitability.

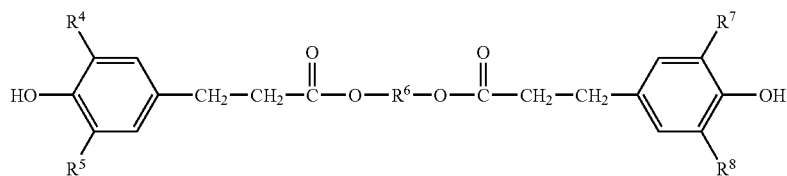

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

The material comprises amounts of from 0.05 to 3% by weight, preferably from 0.1 to 1.5% by weight, in particular from 0.1 to 1% by weight, based on the total weight of the molding compositions A) to D), of the phenolic antioxidants, which may be used individually or in the form of a mixture.

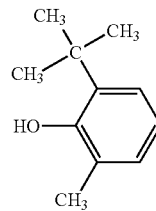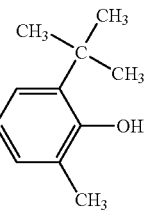

(Irganox® 245 from Ciba-Geigy)

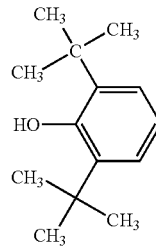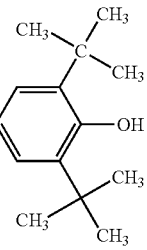

(Irganox® 259 from Ciba-Geigy)

In some instances, sterically hindered phenols having not more than one sterically hindered group in ortho-position with respect to the phenolic hydroxy group have proven particularly advantageous, in particular when assessing color-fastness on storage in diffuse light over prolonged periods.

The inventive molding compositions can comprise from 0 to 3% by weight, preferably from 0.01 to 2% by weight, of the aminic stabilizers, with preference from 0.05 to 1.5% by weight of an amine stabilizer. Sterically hindered amine compounds have preferred suitability. Examples of compounds that can be used are those of the formula

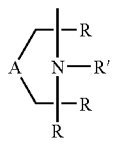

where

R are identical or different alkyl radicals,

R' is hydrogen or an alkyl radical, and

A is an optionally substituted 2- or 3-membered alkylene chain.

Preferred components are derivatives of 2,2,6,6-tetramethylpiperidine, such as:

4-acetoxy-2,2,6,6-tetramethylpiperidine, 4-stearoyloxy-2,2,6,6-tetramethylpiperidine, 4-aryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzoxy-2,2,6,6-tetramethylpiperidine, 4-(phenylcarbamoyloxy)-2,2,6,6-tetramethylpiperidine.

Other suitable compounds are bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(1,2,2,6,6-pentamethylpiperidyl)sebacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl)hexamethylene 1,6-dicarbamate, bis(1-methyl-2,2,6,6-tetramethyl-4-dipiperidyl)adipate, and tris(2,2,6,6-tetramethyl-4-piperidyl)benzene-1,3,5-tricarboxylate.

Other compounds with suitability are moreover relatively high-molecular-weight piperidine derivatives, such as the dimethyl succinate polymer with 4-hydroxy-2,2,6,6-tetramethyl-7-piperidinylethanol, or poly-6-(1,1,3,3-tetramethylbutyl)amino-1,3,5-triazine-2,4-diyl(2,2,6,6-tetramethyl-4-piperidinyl)imino-1,6-hexanediyl(2,2,6,6-tetramethyl-14-piperidinyl)imino, these having particularly good suitability, as also has bis(2,2,6,6-tetramethyl-4-piperidyl) sebacate.

Compounds of this type are commercially available with the name Tinuvin® or Chimasorb® (registered trademark of Ciba Spezialitätenchemie GmbH).

Another particularly preferred amine compound that may be mentioned is Uvinul® 4049H from BASF AG:

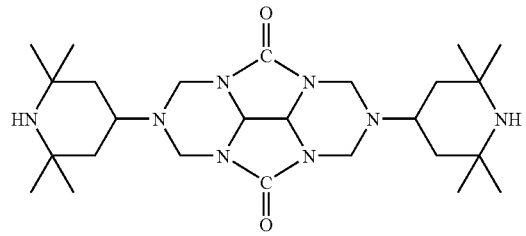

Other particularly preferred examples of stabilizers that can be used according to the invention are those based on secondary aromatic amines, e.g. adducts derived from phenylenediamine with acetone (Naugard® A), adducts derived from phenylene-diamine with linolene, Naugard® 445 (II), N,N'-dinaphthyl-p-phenylenediamine (III), N-phenyl-N'-cyclohexyl-p-phenylenediamine (IV), or a mixture of two or more of these

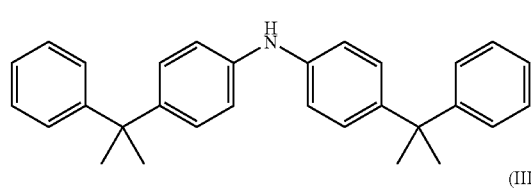

(II)

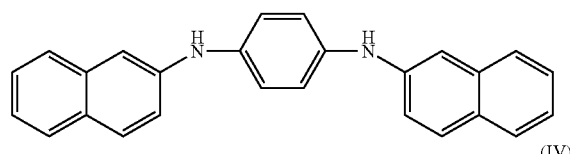

(III)

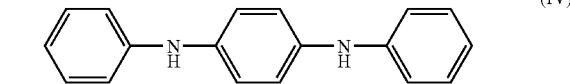

(IV)

Fibrous or particulate fillers D) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, the amounts of these used being up to 40% by weight, in particular from 1 to 15% by weight.

Preferred fibrous fillers that may be mentioned are carbon fibers, aramid fibers, and potassium titanate fibers, particular preference being given here to glass fibers in the form of E glass. These can be used in the form of rovings or chopped glass in the commercially available forms.

The fibrous fillers may have been surface-pretreated with a silane compound to improve compatibility with the thermoplastic.

Suitable silane compounds are those of the general formula

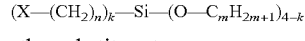

where the substituents are:

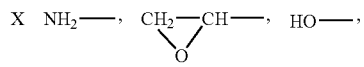

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.01 to 2% by weight, preferably from 0.025 to 1.0% by weight, and in particular from 0.05 to 0.5% by weight (based on the fibrous fillers).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. If appropriate, the mineral filler may have been pretreated with the abovementioned silane compounds; however, this pretreatment is not essential.

Other fillers which may be mentioned are kaolin, calcined kaolin, wollastonite, talc, and chalk, and also lamellar or acicular nanofillers, their amounts preferably being from 0.1 to 10%. Those preferably used for this purpose are boehmite, bentonite, montmorillonite, vermiculite, hectorite, and laponite. The lamellar nanofillers of the prior art are organically modified in order to achieve good compatibility of the lamellar nanofillers with the organic binder. Addition of the lamellar or acicular nanofillers to the inventive nanocomposites leads to a further rise in mechanical strength.

In particular, talc is used, this being a hydrated magnesium silicate whose constitution is $Mg_3[(OH)_2/Si_4O_{10}]$ or $3MgO.4SiO_2.H_2O$. These "three-layer phyllosilicates" have a triclinic, monoclinic, or rhombic crystal structure, with lamellar habit. Other trace elements which may be present are Mn, Ti, Cr, Ni, Na, and K, and the OH group may to some extent have been replaced by fluoride.

It is particularly preferable to use talc comprising 99.5% of particles whose sizes are <20 μm. The particle size distribution is usually determined via sedimentation analysis, and is preferably:
<20 μm 99.5% by weight
<10 μm 99% by weight
<5 μm 85% by weight
<3 μm 60% by weight
<2 μm 43% by weight.

Products of this type are commercially available as Micro-Talc I.T. extra (Omya).

The inventive thermoplastic molding compositions may comprise, as further components D), customary processing auxiliaries such as stabilizers, oxidation retardants, further agents to counter decomposition due to heat or due to ultraviolet light, lubricants, mold-release agents, colorants, such as dyes and pigments, nucleating agents, plasticizers, flame retardants, etc.

Examples that may be mentioned of oxidation retardants and heat stabilizers are phosphites and further amines (e.g. TAD), hydroquinones, various substituted representatives of these groups, and their mixtures, in concentrations up to 1% by weight, based on the weight of the thermoplastic molding compositions.

UV stabilizers that may be mentioned, the amounts used of these generally being up to 2% by weight, based on the molding composition, are various substituted resorcinols, salicylates, benzotriazoles, and benzophenones.

Colorants that can be added are inorganic pigments, such as titanium dioxide, ultramarine blue, iron oxide, and carbon black, and/or graphite, and also organic pigments, such as phthalocyanines, quinacridones, perylenes, and also dyes, such as nigrosin, and anthraquinones.

It is also possible to use flame retardants, e.g. red phosphorus.

Nucleating agents that can be used are sodium phenylphosphinate, aluminum oxide, silicon dioxide, and also preferably talc.

The inventive thermoplastic molding compositions can be prepared by processes known per se, by mixing the starting components in conventional mixing equipment, such as screw extruders, Brabender mixers, or Banbury mixers, and then extruding them. The extrudate can be cooled and comminuted. It is also possible to premix individual components and then to add the remaining starting materials individually and/or likewise mixed. The mixing temperatures are generally from 230 to 320° C.

In another preferred procedure, components B) to C), and also, if appropriate, D) can be mixed with a prepolymer, compounded, and pelletized. The resultant pellets are subsequently solid-phase condensed under an inert gas continuously or batchwise at a temperature below the melting point of component A) until the desired viscosity has been reached. It is preferable to incorporate the emulsion polymer B) in the form of a dispersion comprising solids into the melt of A).

The inventive thermoplastic molding compositions feature good toughness (in particular good fracture energy) together with good UV resistance and heat resistance.

These materials are suitable for production of fibers, of foils, and of moldings of any type. A few preferred examples will be mentioned below:

Household items, electronic components, medical equipment, motor vehicle components.

EXAMPLES

The following components were used:
Component A:
Nylon-6 whose viscosity number VN is 150 ml/g, measured on a 0.5% strength by weight solution in 96% strength by weight sulfuric acid at 25° C. to ISO 307. (Ultramid® B3 from BASF AG was used).
Component B1:
Component B1 was prepared as follows:
800 g of deionized water, 39.70 g of an aqueous polystyrene seed (solids content 33% by weight); number-average particle diameter 32 nm), 198.4 g of 1-octene, 3.28 g of a 50% strength by weight aqueous solution of K 30® emulsifier, 19.65 g of a 20% strength by weight aqueous solution of Lutensol TO 20 emulsifier, and 19.65 g of a 7% strength by weight aqueous solution of sodium persulfate were used as initial charge in a 4 l four-necked flask equipped with anchor stirrer, reflux condenser, and two feed devices, at from 20% to 25° C. (room temperature), under nitrogen, and were heated to 90° C., with stirring. Starting at 90° C., the monomer feed composed of 600 g of deionized water, 3.28 g of a 40% strength by weight aqueous solution of K 30® emulsifier, 19.65 g of a 20% strength by weight aqueous solution of Lutensol TO 20 emulsifier, 8.38 g of a 25% strength by weight aqueous solution of sodium hydroxide, 1076.82 g of n-butyl acrylate, 26.20 g of acrylic acid, and 10.48 g of allyl methacrylate, and the initiator feed, composed of 111.35 g of a 7% strength by weight aqueous solution of sodium persulfate were simultaneously begun, and the monomer feed was continuously fed within a period of 3 hours [in 2 stages, 500 g in 0.5 hour (1000 g/hour) and 1245 g in 2.5 hours (498 g/hour)] and the initiator feed was fed continuously within a period of 3.5 hours. The resultant aqueous polymer dispersion was then allowed to continue reaction for a further 2 hours at 90° C. The aqueous polymer dispersion was then cooled to room temperature and 65.5 g of a 10% strength by weight aqueous solution of sodium hydroxide were admixed. The solids content of the aqueous polymer dispersion was 44% by weight, based on the total weight of the aqueous dispersion. The glass transition temperature of the polymer was –42° C. The polymer particle size was 105 nm. Solids content was increased to 49% by drawing water off in vacuo.

Component Bcomp 1:
Ethylene n-butyl acrylate-acrylic acid copolymer, e.g. Lupolen®D KR 1270 from BASF AG.

Component Bcomp 2:
Paraloid® EXL 3300 core-shell modifier from Rohm & Haas, composed of a core of n-butyl acrylate and a graft shell of MMA (ratio 70/30).

Component C:
Terpolymer based on styrene/acrylonitrile/maleic anhydride (75/24.1/0.9), viscosity number 80 ml/g (measured in 0.5% strength DMF solution at 25° C.) to DIN 53728.

Component D:
Talc, e.g. IT-Extra talc from Omya.

Preparation and Testing of Molding Compositions

The viscosity number of the polyamides was determined to DIN 53 727 on a 0.5% strength by weight solution in 96% by weight sulfuric acid.

The solids content was determined by drying a defined amount of the aqueous polymer dispersion (about 5 g) at 140° C. in a drying cabinet to constant weight. Two separate measurements were made. The value stated in the example is the average of the two results measured.

Glass transition temperature was determined to DIN 53 765 by means of series TA 8000 DSC 820 equipment from Mettler-Toledo.

The heat resistance of the specimens was determined on standard small specimens, by means of the Vicat softening point. The Vicat softening point was determined to DIN 53 460 using a force of 49.05 N and a temperature rise of 50 K per hour.

Fracture energy was determined to ISO 6603 on plaques (60*60*3 mm). UV aging was carried out to Volkswagen AG PV 1303.

Flowability was determined to ISO 1133 using 240° C. and 5 kg load.

The components were mixed in a twin-screw extruder at a melt temperature of from 240 to 260° C. The emulsion of component B1 was fed here into the melt of component A. Water was removed by way of two vacuum vents. The melt was passed through a waterbath and pelletized.

The results of the tests are listed in table 1.

TABLE 1

| Molding composition | comp 1 | comp 2 | 3 | comp 4 | 5 | comp 6 | 7 |
|---|---|---|---|---|---|---|---|
| A | 80 | 80 | 80 | 75 | 75 | 70 | 70 |
| B1 | — | — | 20 | — | 20 | — | 20 |
| Bcomp 1 | 20 | — | — | 20 | — | 20 | — |
| Bcomp 2 | — | 20 | — | — | — | — | — |
| C | — | — | — | 5 | 5 | — | — |
| D | — | — | — | — | — | 10 | 10 |
| Vicat B [° C.] | 156 | 157 | 162 | 154 | 163 | 153 | 161 |
| MVI [ml/10] | 16.5 | 16.4 | 11.7 | 11.2 | 9.1 | 14.3 | 10.5 |
| Ws, RT, 0 h [Nm] | 80 | 43 | 84 | 71 | 73 | 67 | 78 |
| Ws, 500 h [Nm] | 34 | 34 | 76 | 29 | 65 | 23 | 71 |
| Ws, 1000 h [Nm] | 27 | 23 | 73 | 17 | 61 | 15 | 67 |
| Ws, –30° C. [Nm] | 67 | 11 | 79 | 56 | 60 | 45 | 55 |

The invention claimed is:

1. A thermoplastic molding composition, comprising
A) from 10 to 95% by weight of a thermoplastic polyamide,
B) from 5 to 90% by weight of an acrylate rubber, obtained via free-radical-initiated aqueous emulsion polymerization of ethylenically unsaturated monomers in the presence of at least one dispersing agent and of at least one free-radical initiator, where the emulsion polymerization uses
from 1 to 50% by weight of an alkene having from 5 to 12 carbon atoms [monomer A], and
from 50 to 99% by weight of an ester based on an α,β-monoethylenically unsaturated mono- or dicarboxylic acid having from 3 to 6 carbon atoms and on an alkanol having from 1 to 12 carbon atoms [monomer B], and also, if appropriate,
up to 10% by weight of an α,β-monoethylenically unsaturated mono- or dicarboxylic acid having from 3 to 6 carbon atoms and/or its amide [monomer C], and
up to 30% by weight of an α,β-ethylenically unsaturated compound different from the monomers A to C [monomer D],
and the monomers A to D give a total of 100% by weight,
C) from 0 to 40% by weight of a copolymer which comprises vinylaromatic monomer units,
D) from 0 to 70% by weight of further additives,
where the total of the percentages by weight of A) to D) is 100%.

2. The thermoplastic molding composition according to claim 1, where the acrylate rubber B) is obtained via emulsion polymerization of
from 1 to 49.99% by weight of monomer A, and
from 50 to 98.99% by weight of monomer B, and also
from 0.01 to 10% by weight of monomer C.

3. The thermoplastic molding composition according to claim 2, where a 1-alkene is used as monomer A of the acrylate rubber B).

4. The thermoplastic molding composition according to claim 2, where an ester based on an α,β-monoethylenically unsaturated mono- or dicarboxylic acid having 3 or 4 carbon atoms and on an alkanol having from 1 to 8 carbon atoms is used as monomer B.

5. The thermoplastic molding composition according to claim 2, comprising
A) from 20 to 94% by weight of a thermoplastic polyamide,
B) from 5 to 40% by weight of an acrylate rubber,
C) from 1 to 30% by weight of a copolymer,
D) from 0 to 40% by weight of further additives.

6. A molding obtained from the thermoplastic molding composition according to claim 2.

7. The thermoplastic molding composition according to claim 1, where a 1-alkene is used as monomer A of the acrylate rubber B).

8. The thermoplastic molding composition according to claim 7, where an ester based on an α,β-monoethylenically unsaturated mono- or dicarboxylic acid having 3 or 4 carbon atoms and on an alkanol having from 1 to 8 carbon atoms is used as monomer B.

9. The thermoplastic molding composition according to claim 7, comprising
  A) from 20 to 94% by weight of a thermoplastic polyamide,
  B) from 5 to 40% by weight of an acrylate rubber,
  C) from 1 to 30% by weight of a copolymer,
  D) from 0 to 40% by weight of further additives.

10. A molding obtained from the thermoplastic molding composition according to claim 7.

11. The thermoplastic molding composition according to claim 1, where an ester based on an α,β-monoethylenically unsaturated mono- or dicarboxylic acid having 3 or 4 carbon atoms and on an alkanol having from 1 to 8 carbon atoms is used as monomer B.

12. The thermoplastic molding composition according to claim 11, comprising
  A) from 20 to 94% by weight of a thermoplastic polyamide,
  B) from 5 to 40% by weight of an acrylate rubber,
  C) from 1 to 30% by weight of a copolymer,
  D) from 0 to 40% by weight of further additives.

13. A molding obtained from the thermoplastic molding composition according to claim 11.

14. The thermoplastic molding composition according to claim 1, comprising
  A) from 20 to 94% by weight of a thermoplastic polyamide,
  B) from 5 to 40% by weight of an acrylate rubber,
  C) from 1 to 30% by weight of a copolymer,
  D) from 0 to 40% by weight of further additives.

15. A molding obtained from the thermoplastic molding composition according to claim 14.

16. Fiber, foil or molding obtained from the thermoplastic molding composition according to claim 1.

17. A molding obtained from the thermoplastic molding composition according to claim 16.

* * * * *